(12) United States Patent
Ackerman et al.

(10) Patent No.: US 6,254,341 B1
(45) Date of Patent: Jul. 3, 2001

(54) ENGINE HAVING RESISTANCE TO PARTICLE DEPOSITS

(75) Inventors: John Frederick Ackerman, Cheyenne, WY (US); William Randolph Stowell, Rising Sun, IN (US); Dan Ivkovich, Fairfield, OH (US); Robert Alan Johnson, Simpsonville, SC (US); Soon Jai Khang, Cincinnati; Sang Yeng Park, West Chester, both of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/191,824

(22) Filed: Nov. 13, 1998

(51) Int. Cl.[7] .................................................. F01D 25/00
(52) U.S. Cl. ...................................... 415/200; 416/241 R
(58) Field of Search .................... 415/200; 416/241 A, 416/241 B, 241 R, 193 A, 219 R, 220 R; 427/248.1, 421; 428/327, 328, 329, 331, 421, 418, 469, 472, 472.2; 29/888.01

(56) References Cited

U.S. PATENT DOCUMENTS

| | | | |
|---|---|---|---|
| 4,339,719 | * | 7/1982 | Rhines et al. ........................ 324/446 |
| 5,759,699 | * | 6/1998 | French ................................. 428/447 |
| 5,851,679 | * | 12/1998 | Stowell et al. ........................ 428/472 |
| 6,109,018 | * | 8/2000 | Rostrup-Nielsen et al. ........ 60/39.06 |

OTHER PUBLICATIONS

T. Horvath and I. Berta, *Static Elimination*, ix–x, 1–105 (1982).

* cited by examiner

Primary Examiner—Edward K. Look
Assistant Examiner—Liam McDowell
(74) Attorney, Agent, or Firm—Noreen C. Johnson; Douglas E. Stoner

(57) ABSTRACT

An engine, according to an exemplary embodiment of the invention, comprises a compressor which compresses inlet air; a combustor in which a mixture of fuel and air is combusted; a turbine which is driven by gases from the combustor; and a dielectric coating applied to a surface of at least one of: the compressor and the turbine, the dielectric coating having a dielectric constant of at least 3.0 and a loss tangent of at most 0.1, wherein the dielectric coating reduces the magnitude of an electrostatic force which attracts particles flowing through the engine to the surface of the engine. In operation, only a thin layer of particles typically accumulates on the dielectric coating. While the dielectric coating reduces the magnitude of the electric field which attracts particles, the repulsive force produced by the accumulated particles repels additional particles of the same charge. By reducing particle deposits, exemplary embodiments of the invention can reduce degradation in engine performance and provide significant cost savings through avoidance of maintenance.

36 Claims, 3 Drawing Sheets

ENGINE HAVING RESISTANCE TO PARTICLE DEPOSITS

BACKGROUND

1. Field of the Invention

This invention relates generally to the deposition of particles on engine parts, and more particularly to a method and apparatus for reducing particle deposits on the surface of engine parts by coating the engine parts.

2. Description of the Related Art

Gas turbine engines use the well known Brayton cycle to generate a continuous flow of high-pressure, high temperature gas. In a typical gas turbine engine, air is drawn into a rotating compressor which compresses the air, and the air is then heated at constant pressure in a combustion chamber. The high-pressure, high temperature gas exiting the combustion chamber drives the turbine to produce rotational energy.

Gas turbine engines typically show decreasing compressor efficiency over time due to the accumulation of particles on the airfoil surfaces of the compressor. Accumulated particles can reduce the total airflow in the early compressor stages, reduce the pressure ratios in the later compressor stages, and initiate sulfide attack on the later compressor stages. Particles also build up on exhaust ducts as soot (carbon-based combustion by-products), particularly on the low flow and recirculation zone surfaces of the exhaust ducts.

In land-based turbines, filter houses have been utilized to reduce the number and size of particles entering the engine. The filter house comprises a series of particle traps which reduce the number of admitted particles, typically trapping substantially all particles which are larger than about 5 microns in diameter. However, such filter houses are not effective at trapping the smaller particles, e.g. less than about 5 microns in diameter, which pass through the filter into the engine. In addition, it is not generally feasible to use such filters on aircraft engines.

Soot production in gas turbine exhaust ducts is conventionally reduced through careful design of the combustor, i.e., by designing the combustor to efficiently bum substantially all of the fuel. However, it is difficult to produce a combustor which remains soot-free under all operating conditions.

Coatings are known which are applied to airfoil surfaces to protect the airfoils from corrosion. For example, Sermatech in Limerick, Pa. manufactures a coating (Sermatech 5380 DP) which includes aluminum particles and a phosphate glass seal. Such corrosion coatings, however, do not effectively reduce the susceptibility of the airfoil surface to particle deposits.

It would be desirable, therefore, to have a method and apparatus for reducing particle deposits on engine components which was effective and which could be applied to aircraft engines and other gas turbine engines to maintain compressor efficiency and reduce soot deposits on exhaust ducts.

SUMMARY

An engine, according to an exemplary embodiment of the invention, comprises a compressor which compresses inlet air; a combustor in which a mixture of fuel and air is combusted; a turbine which is driven by gases from the combustor; and a dielectric coating applied to a surface of at least one of the compressor and the turbine, the dielectric coating having a dielectric constant of at least 3.0 and a loss tangent of at most 0.1. The dielectric coating reduces the magnitude of an electrostatic force which attracts particles flowing through the engine to the surface of the engine.

The invention also relates to a method for controlling the flow of particles through an engine comprising the steps of coating a surface of the engine with a dielectric coating, the dielectric coating having a dielectric constant of at least 3.0 and a loss tangent of at most 0.1, and electrostatically controlling the flow of particles through the engine with the dielectric coating.

The surfaces of the engine to which the dielectric coating may be applied include surfaces of the turbine, fan, compressor, and exhaust system exposed to the main airflow of the engine ("airflow surfaces"). Typically, the dielectric coating is applied to airfoil surfaces of components of the turbine, compressor, and fan (e.g. airfoil surfaces of blades and vanes), to platforms of the blades, and to components of the exhaust system. The dielectric coating can also be applied to engine surfaces which are not directly exposed to the main airflow of the engine such as shanks and dovetails of turbine blades.

In operation, only a thin layer of particles typically accumulates on the dielectric coating. While the dielectric coating reduces the magnitude of the electric field which attracts particles, the repulsive force produced by the accumulated particles repels additional particles of the same charge. By reducing particle deposits, the problems of decreased compressor efficiency, sulfide attack on high-temperature compressor parts, reduction in airflow in the early compressor stages, reduction in pressure ratios in the later compressor stages, and accumulation of soot on exhaust ducts can be avoided. The invention thus reduces degradation in engine performance and provides significant cost savings through avoidance of maintenance.

BRIEF DESCRIPTION OF THE DRAWINGS

Other features and advantages of the invention will be apparent from the following detailed description and the accompanying drawings, in which.

DETAILED DESCRIPTION OF THE PREFERRED EMBODIMENTS

Figure 1:
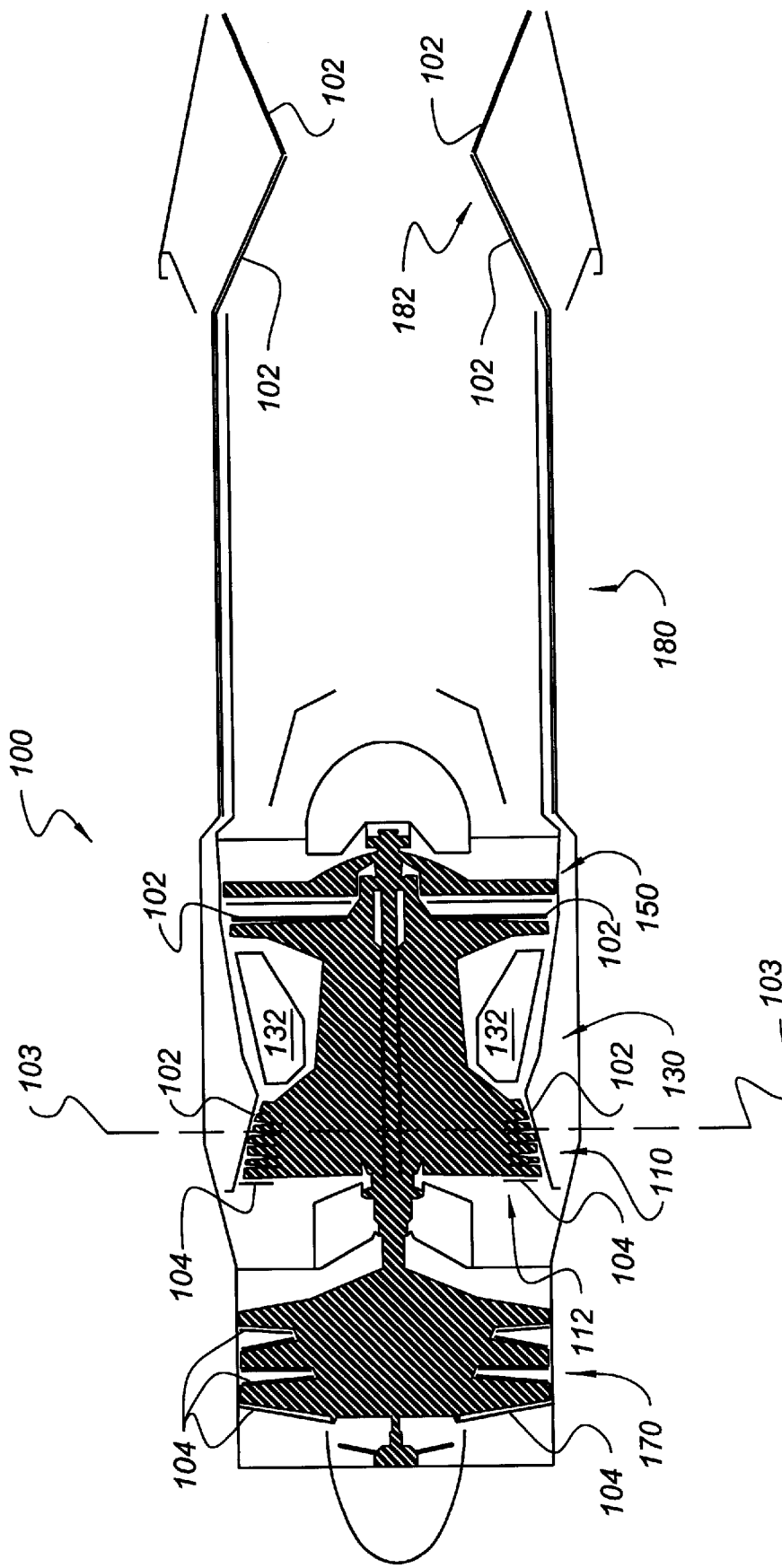
FIG. 1 illustrates a gas turbine engine according to an exemplary embodiment of the invention.

FIG. 1 is a diagram of an engine according to an exemplary embodiment of the invention. The engine 100 of FIG. 1 includes a compressor 110, a combustor 130, a turbine 150, a fan 170, and an exhaust system 180. The engine 100 depicted in FIG. 1 is a turbofan engine, although the invention can be utilized with other types of aircraft engines such as turboprops, turbojets, turboramjets, and land-based engines, for example. The invention can also be used with other types of gas turbine engines, for example land-based gas turbine engines, marine and industrial turbines, and air cycle machines, i.e. turbo compressors.

In operation, ambient air is drawn through the fan 170 to the compressor inlet 112. The compressor 110 includes a number of stages, each stage comprising a row of rotating rotor blades followed by a row of stationary stator vanes. Both the blades and the vanes include airfoil surfaces. Each stage increases the air pressure by a small amount. In operation, the rotor is powered by the turbine 150 to rotate at high velocity so that air is continuously drawn into the compressor 110 and compressed. The air is then accelerated by the rotating compressor blades and swept rearwards onto the adjacent row of stator vanes. The pressure rise is produced as the air is decelerated in the stator passages. From the front to the rear of the compressor, there is a gradual reduction of the air space between the rotor shaft and the stator casing. The reduction in air space is provided to maintain a relatively constant axial velocity as the volume of the compressed air decreases.

The hot, high-pressure air exiting the compressor 110 is fed into the combustor 130. The combustor 130 may comprise, for example, an annular combustion chamber 132 which burns fuel injected into the hot, high-pressure air. The combustion chamber 132 typically includes a primary combustion zone, in which a portion, e.g. 20%, of the high velocity air is decelerated and ignited with injected fuel. The combustion chamber 132 also typically includes a dilution zone in which the remainder of the air recombines with the ignited air to lower the temperature of the ignited air before it is fed into the turbine 150.

The turbine 150 provides the power to drive the compressor 110, and in the case of engines which do not rely entirely on jet propulsion, provides shaft power for the fan 170. The turbine 150 converts energy from the hot, high-pressure, high-velocity gases of the combustor 130 into rotational energy. To produce the rotational energy, the turbine 150 may include a plurality of stages, each stage comprising a row of stationary nozzle guide vanes and a row of moving blades. The number of stages typically depends on the power desired from the gas flow, the desired rotational speed of the turbine, and the desired diameter of the turbine.

The exhaust system 180 passes discharge gases from the turbine 150 to the atmosphere. The velocity of the gases exiting the exhaust system 180 depends on the type of engine. For example, in a turboprop engine the exhaust gases provide a low velocity and small thrust, whereas in a turbojet engine, the exhaust system provides all the thrust. The exhaust gases pass to the atmosphere through the propelling nozzle 182, which is a convergent duct which increases the gas velocity. A variable area nozzle can be used to maintain a desired balance of pressure and temperature in different operating conditions.

An afterburner can be provided to increase the thrust of an engine for short periods. The afterburner includes a plurality of fuel injectors which inject fuel into the exhaust stream between the turbine 150 and the propelling nozzle 182. The unburned oxygen in the exhaust gas is used to sustain combustion of the fuel injected by the afterburner. The resultant increase in the temperature of the exhaust gas provides an increased velocity to the gas exiting the propelling nozzle 182, increasing the thrust of the engine.

In operation, many of the airflow surfaces of the engine 100 are bombarded by particles from the ambient air. In certain areas, the particles accumulate and can affect engine performance. For example, the compressor 110 may exhibit a decreased efficiency over time due to the build up of particles on the airfoil surfaces of the compressor. In the early (low temperature) stages of the compressor, accumulated particles can affect engine performance by reducing the total airflow, which leaves less air to drive the turbine or produce thrust.

In the later (high temperature) stages of the compressor, accumulated particles can reduce pressure ratios (i.e. the ratio of the pressure after a stage to the pressure before the stage), because as the gas density increases, the amount of pressure increase provided by a stage becomes more sensitive to the aerodynamic properties of the airfoil surfaces of the blades and vanes.

Particle accumulation in the later compressor stages can also initiate hot corrosion, e.g. sulfide attack, on compressor blades, which may occur, for example, at temperatures of about 675° C. or more. For example, the surfaces of the compressor may experience thermal stresses which produce a thermal decomposition of the particle into a sulfide such as nickel sulfide (NiS). Nickel sulfide may then attack the substrate of the compressor blade. In the exhaust system 180, particles can build up as soot on low flow and recirculation zone surfaces, as well as on surfaces with direct impingement or laminar flow.

The inventors have identified examples of particles which accumulate on the airflow surfaces of engines such as ground-based turbines and aircraft engines. Such particles include, for example, calcium sulfate hydrate (gypsum) and sodium potassium silicate (fly ash) of about 0.5–2.0 micrometers, among others. In some cases, these inorganic components are combined with small amounts of lubricating oil from the engine systems. Soot (carbon-based combustion by-products) may accumulate on engine surfaces, for example downstream of the combustor.

In experiments performed by the inventors, the phenomenon responsible for the accumulation of particles was determined to be electrostatic attraction. A Van de Graaff generator was used to generate high voltage, low current arcs which were applied to an engine surface covered with soot. The particles in the vicinity of the arc were expelled from the engine surface, and after traveling away from the arc, were once again attracted to the engine surface at a location remote from the arc. The experiment indicates that the particles accumulate on the engine surface due to electrostatic attraction.

Incoming particles can become charged in a number of ways, each of which typically involves the triboelectric effect, in which charge is exchanged between particles during a collision. For example, a particle can acquire a charge by colliding with another particle. This typically occurs frequently inside the engine, because the particles are traveling at high velocities in a small space. A particle can also acquire a charge by colliding with a surface of the engine or through friction with the surrounding air.

Once a particle has been charged, it can be attracted to the surfaces of the engine. In an aircraft engine or a land-based turbine, the surfaces of the engine may acquire a charge opposite to that of the particles such that the engine surfaces attract the particles electrostatically. In a land-based turbine, the particles may be attracted to a grounded engine surface by inducing an opposite charge in the engine surface. The electrostatic attraction from the engine surface is typically greater than the electrostatic repulsion from the particles of the same charge which may have accumulated on the engine surface. Gypsum particles and fly ash may be especially susceptible to accumulation due to their polarity, as one pole may be attracted to an oppositely charged engine surface. Gypsum particles and fly ash may also be susceptible to accumulation because of the ease at which they become triboelectrically charged.

Figure 5:
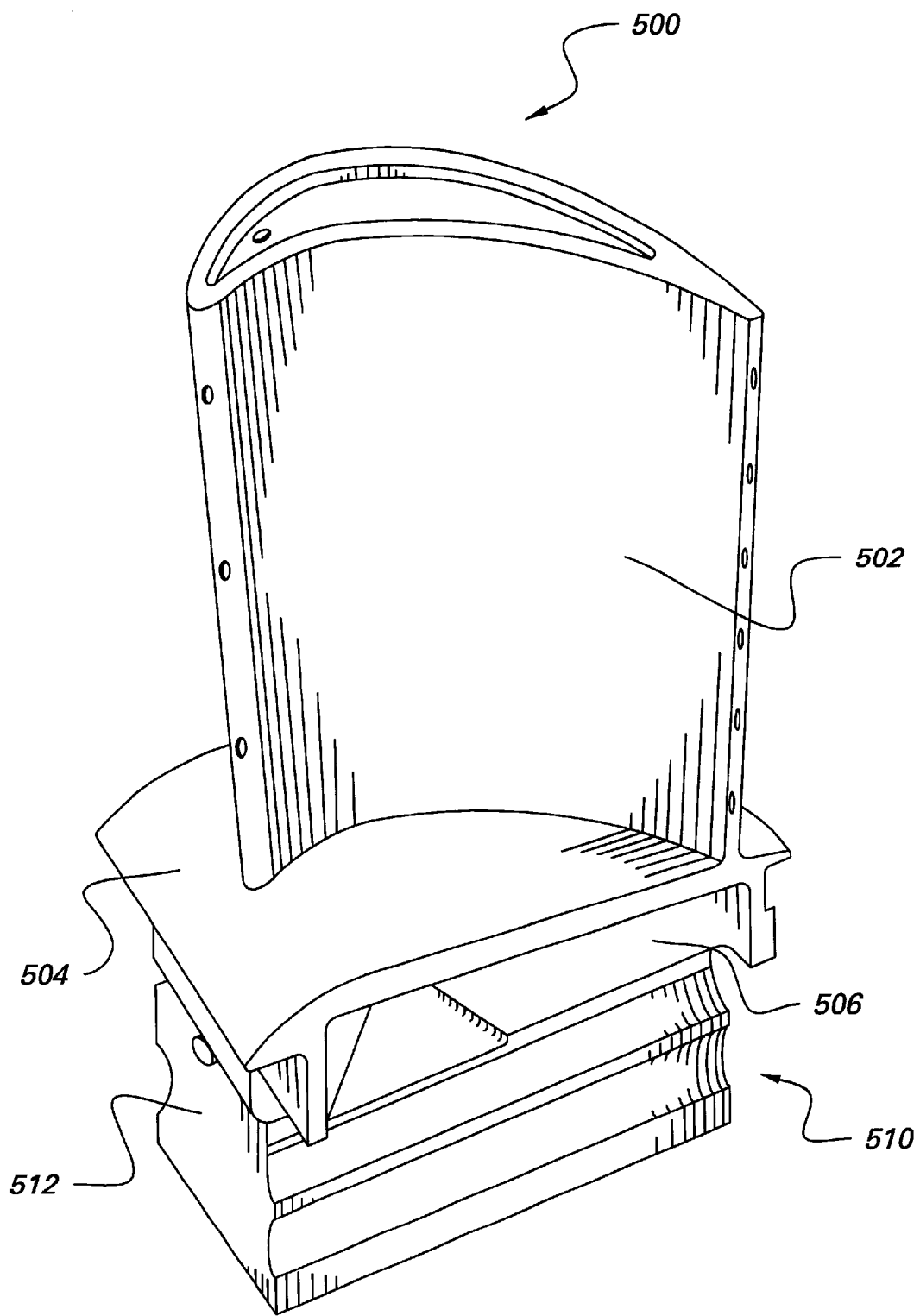
FIG. 5 illustrates an exemplary turbine blade.

According to an exemplary embodiment of the invention, a dielectric coating is applied to selected surfaces of the engine to reduce the amount of particles deposited on the engine. As shown in FIG. 1, the dielectric coating can be applied to surfaces of the engine exposed to the airflow of the engine (airflow surfaces), including surfaces of the compressor 110, the fan 170, the turbine 150, and the propelling nozzle 182. Typically, the dielectric coating is applied to substantially all of the airfoil surfaces of the vanes and blades (also known as "buckets") of the compressor 110, the fan 170, and the turbine 150. An example of an airfoil surface of a turbine blade is shown in FIG. 5 as element 502.

The dielectric coating can also be applied to airflow surfaces other than airfoil surfaces, such as to the platforms (element 504 in FIG. 5) of turbine blades, compressor blades, and fan blades. The dielectric coating can also be applied to engine surfaces not directly exposed to the main airflow such as the shanks (element 506 in FIG. 5) and dovetail faces (element 510 in FIG. 5) of turbine blades. To achieve a desired combination of low manufacturing cost and reduced deposits, it is possible to coat only selected portions of the airfoil surfaces rather than the entire airfoil surfaces.

The dielectric coating typically has a dielectric constant of at least 3.0 and a loss tangent of at most 0.1, more typically a dielectric constant of at least 4.5 and a loss tangent of at most 0.01, and most typically a dielectric constant of at least 10 and a loss tangent of at most 0.005. If the dielectric coating is made from more than one material, e.g. a composite material, the coating as a whole typically has a dielectric constant of at least 3.0 and a loss tangent of at most 0.1, more typically a dielectric constant of at least 4.5 and a loss tangent of at most 0.01, and most typically a dielectric constant of at least 10 and a loss tangent of at most 0.005. As is known in the art, the loss tangent of a material is conventionally defined by tan δ in the following equation:

$$W = \omega C V^2 \tan \delta$$

where W is the power loss, ω is the angular frequency (=2πν), V is the rms voltage, and C is the capacitance.

Typically, a first type of dielectric coating is applied to higher temperature surfaces, e.g. >150° C., and a second type of dielectric coating is applied to lower temperature surfaces, e.g. <150° C. For example, as shown in FIG. 1, a high temperature dielectric coating 102, effective at temperatures greater than 150° C., can be applied to the later (high temperature) stages of the compressor 110 (to the right of the dotted line 103), to the turbine blades and vanes, and to the propelling nozzle 182. A low temperature dielectric coating 104, effective at temperatures less than 150° C., can be applied to the exposed surfaces of the fan 170 and to the early (low temperature) stages of the compressor 110 (to the left of the dotted line 103).

Figure 4:
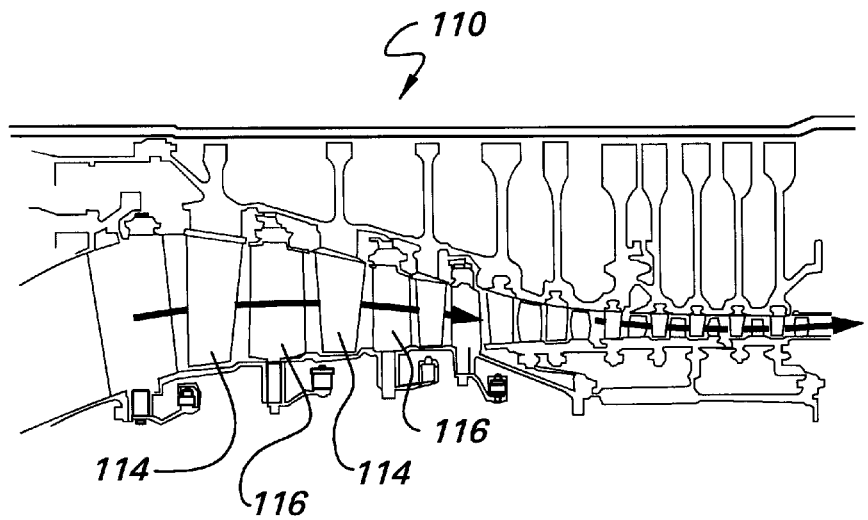
FIG. 4; illustrates an exemplary compressor.

FIG. 4 shows components of the compressor 110 in more detail. In FIG. 4, the compressor 110 includes ten stages, each stage comprising a row of rotating rotor blades 114 followed by a row of stationary stator vanes 116. Typically, the entire airfoil surface of each rotor blade 114 and stator vane 116 is coated with the dielectric coating. Alternatively, selected portions of the airfoil surfaces of the blades 114 and vanes 116 can be coated to achieve a desired combination of low manufacturing cost and reduced deposits.

FIG. 5 shows an exemplary turbine blade 500 which includes an airfoil 502, a platform 504, a shank 506, and a dovetail 510. In a typical engine, a substantial amount of the compressor exit air bypasses the combustor and is forced down interior passages in the turbine blades to cool them. This air follows a convoluted path which increases the probability that particles will be charged by the triboelectric effect. Some of the air passes over the dovetails 510 of the turbine blades which typically have the greatest mechanical forces exerted on them and are the most susceptible to hot corrosion and fatigue due to particle decomposition. In FIG. 5, both faces 512 of the dovetail 510 of the turbine blade 500 may be coated with a dielectric coating to reduce the amount of particles which are deposited on the dovetail 510. The shank 506 may also be coated with the dielectric coating to reduce particle deposits.

Figure 2:
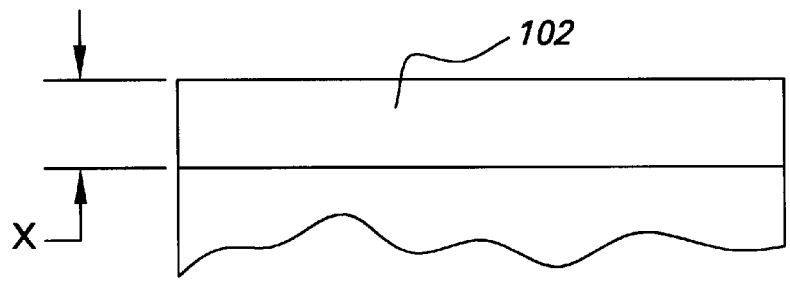
FIG. 2 illustrates a high-temperature dielectric coating applied to a surface of the gas turbine engine of FIG. 1.

FIG. 2 illustrates the high temperature dielectric coating 102 formed on a surface of the engine, which may comprise a titanium- or nickel-based superalloy or a composite material, for example. In FIG. 2, the high temperature dielectric coating may comprise a metal oxide such as aluminum oxide, tantalum oxide, hafnium oxide, or yttrium oxide, for example. Typically, the high temperature dielectric coating 102 has a dielectric constant of at least 3.0 and a loss tangent of at most 0.1, more typically a dielectric constant of at least 4.5 and a loss tangent of at most 0.01, and most typically a dielectric constant of at least 10 and a loss tangent of at most 0.005. The high temperature dielectric coating 102 typically has a thickness "x" of about 0.3–5 microns, more typically about 1–4 microns. The high temperature dielectric coatings disclosed above are typically applied by chemical vapor deposition (CVD), but may also be applied by physical vapor deposition (PVD), plasma spraying, evaporation, or sputtering, for example.

Other examples of high temperature dielectric coatings include: silicon oxide applied by CVD or sputtering and having a dielectric constant of about 3.5; niobium oxide applied by CVD or sputtering and having a dielectric constant of about 6; titanium oxide applied by CVD or sputtering and having a dielectric constant of about 30; thorium oxide applied by CVD or sputtering and having a dielectric constant of about 10; zirconium oxide applied by CVD or sputtering and having a dielectric constant of about 10, and mixtures of these materials with each other.

The high temperature dielectric coating 102 provides the advantage of high dielectric strength (e.g. dielectric constant >3.0) to reduce particle deposits and a very small thickness (e.g. <5 microns). Because the thickness is small, the coating 102 typically has an insubstantial effect on the airflow over the coated part.

Figure 3:
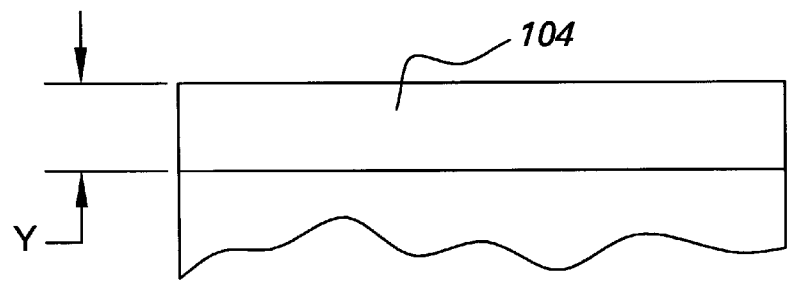
FIG. 3 illustrates a low-temperature dielectric coating applied to another surface of the gas turbine engine of FIG. 1.

FIG. 3 illustrates the low temperature dielectric coating 104 formed on a surface of the engine such as an airfoil surface. The low temperature dielectric coating 104 may comprise a binder, such as a polymer or epoxy-based binder, having a high dielectric constant, optionally filled with an electrically insulative filler. Typically, the dielectric constant of the low temperature dielectric coating 104 as a whole is at least 3.0, more typically above 4.5, and most typically above 10.0. Typically, the loss tangent of the low temperature dielectric coating 104 as a whole is at most 0.1, more typically at most 0.01, and most typically at most 0.005. The low temperature dielectric coating 104 typically has a thickness "y" of about 0.5–10 mils (about 13–250 microns). The electrically insulative filler material typically comprises about 50–90 weight percent of the low temperature dielectric coating 104. The low temperature dielectric coating 104 offers the advantages of ease of application and low cost. For example, the coating 104 can be sprayed onto engine parts with conventional paint-spraying equipment.

Examples of suitable low temperature dielectric coatings include: 1) an epoxy-based binder filled with silicon dioxide, wherein the combination has a dielectric constant of about 4, is applied by spraying, and is effective up to a temperature of about 150° C.; 2) a RADEL polymer, available from Amoco, filled with zirconium oxide, wherein the combination has a dielectric constant of about 5, is applied to the engine surface by autoclave bonding at 100–150° C. and 14–15 psi, and is effective up to about 200° C.; 3) an XSIL 2000 binder, available from GE Silicones, filled with aluminum oxide, wherein the combination has a dielectric constant of about 6, is applied by spraying, and is effective up to about 175° C.; 4) aluminum oxide applied by sputtering; and 5) TEFLON applied by spraying or painting, effective up to a temperature of about 150° C. Other dielectric filler materials which can be added to a suitable binder include calcium titanate, barium titanate, lithium niabate, magnesium oxide, and mica, for example.

In operation, charged particles collide with the engine surfaces and may be electrostatically attracted to the engine surfaces, including those engine surfaces coated with a dielectric coating 102, 104. After a number of hours of operation, particles typically will have accumulated on the engine surfaces including those coated with a dielectric coating. The dielectric coating, however, limits the number of particles which accumulate on it. The dielectric coating significantly reduces the magnitude of the electric field and electrostatic force which attract the particles. In addition, the accumulated particles repel additional airborne particles of the same charge.

In general, only airborne particles which are very close to the coated engine surface are attracted with sufficient force to stick to the engine surface. Thus, a much larger percentage of airborne particles will pass through the engine. Accumulation is limited to a significantly smaller amount, and only a thin layer of particles will be present on the dielectric coating.

Exemplary embodiments of the invention thus provide the advantage that particle deposits on airfoil and other airflow surfaces of the engine can be significantly reduced. By reducing particle deposits, the problems of decreased compressor efficiency, sulfide attack, reduction in airflow in the early compressor stages, reduction in pressure ratios in the later compressor stages, and accumulation of soot on exhaust ducts can be avoided. The invention thus reduces degradation in engine performance and provides significant cost savings through avoidance of maintenance.

Other embodiments of the invention will be apparent to those skilled in the art from a consideration of this specification or practice of the invention disclosed herein. It is intended that the specification and examples be considered as exemplary only, with the true scope and spirit of the invention being defined by the following claims.

What is claimed is:

1. An engine comprising:
   a compressor which compresses inlet air;
   a combustor in which a mixture of fuel and air is combusted;
   a turbine which is driven by gases from the combustor; and
   a dielectric coating applied to a surface of at least one of the compressor and the turbine, the dielectric coating having a dielectric constant of at least 3.0 and a loss tangent of at most 0.1.

2. The engine of claim 1, wherein the dielectric coating reduces the magnitude of an electrostatic force which attracts particles flowing through the engine to the surface of the engine.

3. The engine of claim 1, wherein the surface comprises an airfoil surface of at least one of a blade or a vane of at least one of the compressor and the turbine.

4. The engine of claim 1, wherein the dielectric coating is applied to at least one of a dovetail and a shank of a blade of the turbine.

5. The engine of claim 1, wherein the dielectric coating is applied to a platform of a blade of the turbine.

6. The engine of claim 1, wherein the dielectric coating has a dielectric constant of at least 4.5 and a loss tangent of at most 0.01.

7. The engine of claim 1, wherein the dielectric coating has a dielectric constant of at least 10.0 and a loss tangent of at most 0.005.

8. The engine of claim 1, wherein the engine comprises an aircraft engine.

9. The engine of claim 1, wherein the engine comprises a land-based gas turbine.

10. The engine of claim 1, wherein the dielectric coating comprises a metal oxide.

11. The engine of claim 1, wherein the dielectric coating comprises at least one of aluminum oxide, tantalum oxide, hafnium oxide, and yttrium oxide.

12. The engine of claim 1, wherein the dielectric coating comprises at least one of silicon oxide, niobium oxide, titanium oxide, thorium oxide, and zirconium oxide.

13. The engine of claim 1, wherein the dielectric coating has a thickness of less than about 5 microns.

14. The engine of claim 1, wherein the dielectric coating comprises a binder filled with an electrically insulative filler material.

15. The engine of claim 14, wherein the binder comprises at least one of an epoxy and a polymer.

16. The engine of claim 14, wherein the dielectric filler material comprises at least one of silicon dioxide, zirconium oxide, aluminum oxide, calcium titanate, barium titanate, lithium niabate, magnesium oxide, and mica.

17. The engine of claim 1, further comprising a second dielectric coating applied to a second airflow surface of at least one of the compressor and the turbine, the second airflow surface having an operating temperature which is lower than an operating temperature of the airflow surface.

18. The engine of claim 17, wherein the second dielectric coating has a dielectric constant of at least 3.0.

19. The engine of claim 18, wherein the airflow surface includes a last compressor stage, and the second airflow surface includes a first compressor stage.

20. The engine of claim 17, wherein the second dielectric coating has a thickness of less than about 250 microns.

21. The engine of claim 17, wherein the second dielectric coating comprises a binder filled with a dielectric filler material, wherein the binder comprises at least one of an epoxy and a polymer, and the dielectric filler material comprises at least one of silicon dioxide, zirconium oxide, aluminum oxide, calcium titanate, barium titanate, lithium niabate, magnesium oxide, and mica.

22. A method for controlling the flow of particles through an engine comprising the steps of:
   coating a surface of the engine with a dielectric coating, the dielectric coating having a dielectric constant of at least 3.0 and a loss tangent of at most 0.1; and
   electrostatically controlling the flow of particles through the engine with the dielectric coating.

23. The method of claim 22, wherein the dielectric coating decreases the magnitude of an electrostatic force produced by the engine which acts on the particles.

24. The method of claim 22, wherein the surface comprises an airfoil surface.

25. The method of claim 22, wherein the surface comprises at least one of a shank, a platform, and a dovetail of a turbine blade.

26. The method of claim 22, wherein the dielectric coating comprises at least one of aluminum oxide, tantalum oxide, hafnium oxide, and yttrium oxide.

27. The method of claim 26, wherein the coating is applied to the surface of the engine by chemical vapor deposition.

28. The method of claim 22, wherein the dielectric coating comprises at least one of silicon oxide, niobium oxide, titanium oxide, thorium oxide, and zirconium oxide.

29. The method of claim 22, wherein the dielectric coating comprises a binder filled with an electrically insulative filler material.

30. The method of claim 22, further comprising the step of coating a second surface of the engine with a second dielectric coating, wherein the second surface has a lower operating temperature than the surface.

31. The method of claim 30, wherein the second dielectric coating comprises a binder filled with an electrically insulative filler material.

32. The method of claim 30, wherein the second dielectric coating is applied to the second surface by spraying.

33. The method of claim 30, wherein the second surface comprises a first compressor stage and the surface comprises a last compressor stage.

34. An engine comprising:

a compressor which compresses inlet air;

a turbine driven at least in part by gases which have passed through the compressor; and a dielectric coating applied to a surface of at least one of the compressor and the turbine, the dielectric coating having a dielectric constant of at least 3.0 and a loss tangent of at most 0.1.

35. The engine of claim 34, wherein the surface comprises an airfoil surface of at least one of a blade and a vane of at least one of the compressor and the turbine.

36. An engine comprising:

a compressor which compresses inlet air;

a turbine driven at least in part by gases which have passed through the compressor; and means for reducing the magnitude of an electrostatic force which attracts particles flowing through the engine to a surface of the engine, the means for reducing having a dielectric constant of at least 3.0 and a loss tangent of at most 0.1.

* * * * *